Figure 1:
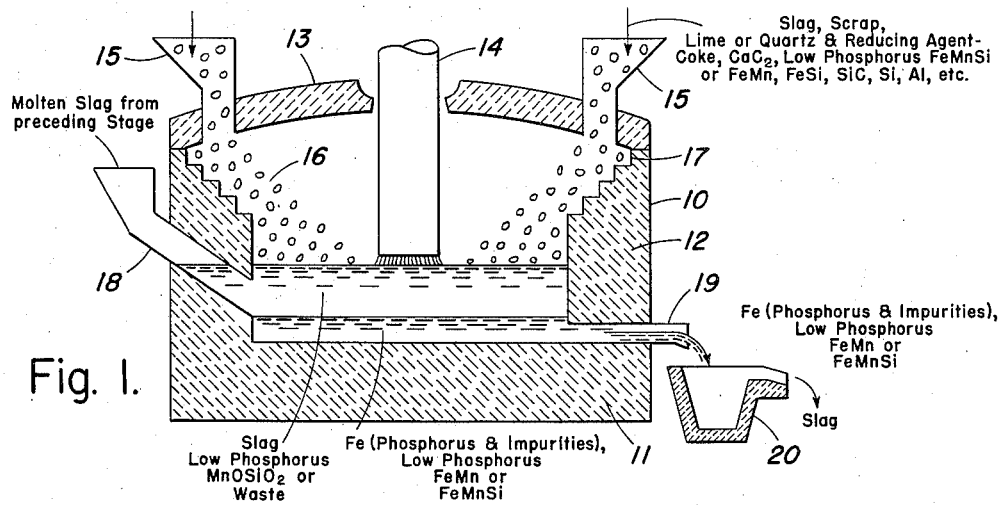

April 15, 1958 M. J. UDY 2,830,891
PROCESS FOR THE PRODUCTION OF FERROMANGANESE
PRODUCTS FROM MANGANESE-BEARING MATERIALS
Filed July 22, 1955

INVENTOR
Marvin J. Udy
BY Charles J. Elderkin
ATTORNEY

United States Patent Office 2,830,891
Patented Apr. 15, 1958

2,830,891

PROCESS FOR THE PRODUCTION OF FERROMANGANESE PRODUCTS FROM MANGANESE-BEARING MATERIALS

Marvin J. Udy, Niagara Falls, N. Y., assignor to Strategic-Udy Metallurgical & Chemical Processes Limited, Hamilton, Ontario, Canada, a corporation of Ontario Application July 22, 1955, Serial No. 523,698

11 Claims. (Cl. 75—11)

The present invention relates to metallurgy and has for an object the provision of an improved metallurgical process. More particularly, the invention contemplates the provision of an improved metallurgical process which can be employed advantageously and economically to produce high-grade metallic manganese products from relatively low-grade manganese-bearing materials. The principal object of the invention is the provision of an improved process for the production of ferromanganese products from relatively low-grade manganese bearing materials, and, in particular manganese ores of relatively low manganese content and high iron and phosphorus content.

This application is a continuation-in-part of my copending United States application Serial No. 341,415, filed March 10, 1953, entitled "Manganese Recovery," which was issued as U. S. Patent No. 2,775,518 on December 25, 1956.

In accordance with the process of my aforementioned copending application, in smelting high phosphorus manganese ores and slags of relatively low manganese content and high in iron and phosphorus, I effect the selective reduction of iron in an initial smelting operation for the removal of iron which functions as a collector for phosphorus and other impurities present in the original ore, with the production of a manganese silicate slag low in phosphorus and iron which may be treated in a subsequent smelting stage for the production of valuable ferromanganese products. In accordance with my prior process, phosphorus may be removed to one-tenth of one percent to two-tenths of one percent (0.1 to 0.2%) in the molten slag produced in the initial smelting stage. I have found, however, that in treating ores of relatively low manganese content, such as manganese ores containing approximately ten to twenty percent (10 to 20%) manganese, or open hearth slags, the phosphorus removal effected by my prior process is not adequate to meet the standard specifications for commercial ferromanganese products. Thus, in high grade ore the ratio of manganese to phosphorus should be in the order of 48 to 0.1 maximum, to provide for the production of ferromanganese products under the 0.3% maximum phosphorus content permitted by commercial specifications. On the other hand, if an ore is high in iron and phosphorus and contains manganese in the order of only twelve percent (12%), although the phosphorus may be removed to one-tenth of one percent (0.1%) and the manganese content concentrated to approximately twenty-four percent (24%) by my prior process, the ratio of manganese to phosphorus in the molten slag remaining after removal of iron would be in the order of 24 to 0.1, with the result that subsequent treatment of this slag for the production of a standard grade (80% Mn) ferromanganese product would result in an alloy containing phosphorus in an amount in excess of the maximum permissive commercial limit as stated hereinbefore. For this reason ores and slags of the general type described cannot be treated economically by any known process.

The present invention is based in part on my discovery that by employing a low phosphorus ferromanganese or ferromanganese silicon alloy as the reducing agent in place of coke for the selective reduction of iron and removal of phosphorus from high iron, high phosphorus, low manganese ores, I am able to produce a manganese silicate slag of low phosphorus content and increased manganese oxide content by reason of low phosphorus manganese added to the slag from the ferromanganese or ferromanganese silicon reducing agent. The reactions may be represented as follows, when employing a ferromanganese silicon alloy as reducing agent:

(1) $3Si + 2Fe_2O_3 \longrightarrow 4Fe + 3SiO_2$
(2) $3FeMn + Fe_2O_3 \longrightarrow 5Fe + 3MnO$
(3) $3FeMnSi + Fe_2O_3 \longrightarrow 9Fe + 3MnO + 3SiO_2$ or, with a high-carbon ferromanganese alloy as reducing agent:

(4) $3FeMn + Fe_2O_3 \longrightarrow 5Fe + 3MnO$
(5) $Fe_2O_3 + 3C \longrightarrow 2Fe + 3CO$ Carbon present in the ferromanganese alloy employed as reducing agent will also function to reduce iron from the ore or slag under treatment as indicated by Equation 5 above for high-carbon ferromanganese.

The process of the invention is essentially a two-stage process, in the first stage of which I treat natural or altered charge material of relatively low manganese (oxide) content and relatively high in iron and phosphorus, by smelting in a covered electric furnace under accurate conditions of temperature control as described fully hereinafter, a pretreated, substantially constant composition charge with a controlled amount of ferromanganese or ferromanganese silicon reducing agent, and a controlled amount of added basic or acidic fluxing material, to effect reduction to the metallic state of iron of the charge, without reducing to the metallic state any substantial amount of the manganese of the original charge, and with the production of molten metallic iron low in manganese and containing the phosphorus and any other impurities present in the original charge such as arsenic, lead, copper, sulphur, etc., and a molten manganese silicate-bearing slag containing the manganese of the original charge in oxide form and manganese oxide added to the slag from manganese of the ferromanganese alloy used as the reducting agent. Thus, the overall effect of employing a ferromanganese alloy as reducing agent in the selective reduction of iron, in accordance with a process of my invention, is to raise the manganese content of the slag while lowering the phosphorus content, and thereby establishing a manganese-phosphorus ratio within the slag such as will permit treatment of the slag for the production of ferromanganese products of phosphorus content well within the maximum permissive commercial limit. The charge components to the first stage, are regulated to provide for the production of a molten slag product having a base to acid ratio (including manganous oxide as a base), in the approximate proportion 1 base to 1 acid, or anywhere within the range 0.8 to 1.5 base to 1.0 acid. For optimum results, however, I prefer to operate the first furnace to produce slag having a base-acid ratio of approximately 1.2 base to 1.0 acid to 1.3 base to 1.0 acid.

I separate the metallic iron from the low-phosphorus manganese silicate-bearing slag produced in the first stage and charge the slag in the molten state to a second furnace in which it is smelted under accurate conditions of temperature control, and in the presence of a controlled amount of added carbonaceous reducing agent or non-carbonaceous reducing agent, and controlled amounts of added fluxing material to produce a ferromanganese product of high, medium or low-carbon content and a waste slag product. Alternatively, I may treat the low-phosphorus manganese silicate-bearing slag recovered from the first stage by smelting in the second stage under such conditions as to produce a low-phosphorus ferromanganese silicon product of controlled silicon content (19–45%) and controlled carbon content (1.5 to 0.06%), for marketing as such, or for recycling for use as a reducing agent in the initial smelting operation, or, I may charge the ferromanganese silicon thus produced to a third furnace of the arc resistance—slag resistance type, as described hereinafter, together with additional quantities of manganese silicate slag from the first stage, and employ the ferromanganese silicon as a reducing agent in the production of low-phosphorus, medium-carbon or low-carbon ferromanganese products. In operating the second stage reduction step for the production of ferromanganese silicon, the product may be controlled with respect to silicon-carbon content to provide a product ideally suited for the production of medium-carbon ferromanganese in the third furnace, i. e., a ferromanganese silicon product of approximately eighteen percent (18%) silicon and approximately one and one-half percent (1.5%) carbon, or, it may be adjusted to provide a product of silicon-carbon content ideally suited for the production of low-carbon ferromanganese in the third stage, i. e., a ferromanganese silicon product of approximately forty to forty-five percent (40–45%) silicon and approximately six-hundredths of one percent (0.06%) carbon.

While the foregoing discovery forms the basic feature of my present invention, the overall efficiency of my process is influenced by a number of other factors with respect to manganese smelting techniques, as explained hereinafter. Thus, according to some heretofore customary practices employed in the smelting of manganese oxide-bearing materials, substantial quantities of basic fluxing material such as lime and dolomite are employed for fluxing acid components of the charge, such as silica. This type of practice results in the production of large quantities or volumes of high-melting point slags which, in turn, necessitate operating at relatively high temperatures in order to produce fluid or workable slags. The use of high temperatures results in high volatilization losses of manganese, and, in addition, the production of large quantities or volumes of slag contributes further to loss of manganese values by providing large volumes of solvent or vehicle for manganese compounds from which it is impossible to recover manganese on any economical basis. Furthermore, in prior processes of the general class described, the conventional practice is to effect reduction of the manganese ore in a submerged arc type of electric furnace to which charge material is fed such as to build up and maintain a substantially deep bed or column of raw charge material surrounding the furnace electrodes. In this type of operation, it is not possible to obtain more than approximately eighty percent (80%) of manganese values contained in the original charge material, even when treating high-grade manganese oxide ores, except possibly by resorting to multi-stage techniques wherein the manganese-bearing slag product recovered from an initial reduction operation is treated in a subsequent stage or stages for further recovery of manganese or manganese-bearing products in the manner described in my aforementioned patent. Under existing operating techniques, attempts at increasing the percentage recovery of manganese usually result in over-driving the furnace with subsequent loss of manganese through volatilization, and operating costs are such that it is not economically feasible to even attempt recoveries from ores or slags of the type which may be treated successfully and cheaply in accordance with a preferred process of the present invention.

The present invention is, therefore, also based in part on my further discovery that substantial advantages with respect to manganese recovery may be obtained by avoiding the addition of substantial amounts of basic fluxing material to a charge of manganese oxide-bearing material which is to be smelted in the presence of a solid carbonaceous reducing agent such as coal or coke, or a non-carbonaceous reducing agent such as ferromanganese or ferromanganese silicon. In accordance with a further feature of my invention, the manganese ore or concentrate in which manganese is present in the form of one or more higher oxides than manganous oxide (MnO), as, for example, in the form of manganese dioxide or pyrolusite ($MnO_2$) or hausmannite ($Mn_3O_4$) or both, is smelted in the initial smelting stage with low-phosphorus ferromanganese or ferromanganese silicon under such conditions of control as to utilize as a basic fluxing agent manganous oxide (MnO) of the ore or concentrate rather than substantial amounts of added basic fluxing material such as lime or dolomite in any form. In particular, I have found that by utilizing the basic properties of manganous oxide (MnO) in smelting manganese oxide-bearing ores or slags of the general class described, I can remove iron and impurities such as phosphorus, and concentrate substantially all of the manganese values in a low phosphorus, manganese-enriched slag for treatment in a subsequent stage in the production of valuable manganese-bearing products. The smelting temperature is thereby maintained sufficiently low to produce fluid or workable slags, and to substantially completely avoid volatilization losses of manganese. Furthermore, the volume of slag produced is lowered to such a degree that recoveries of manganese in a subsequent stage are of the order of ninety to ninety-five percent (90–95%) and higher.

In the submerged arc type of smelting technique employed heretofore in industry, the positioning of charge material surrounding the furnace electrodes as described hereinbefore, very often results in an undesirable concentration of coke around the electrodes which makes it virtually impossible to control operating temperatures in the furnace to any accurate degree, and very often results in over-reduction of the charge with increased volatilization losses. In accordance with a further feature of my present invention, I avoid this phenomenon completely and am able to obtain a very accurate temperature control in both stages of my process through careful positioning of the furnace electrodes in a manner similar to that described in my aforementioned patent. Specifically, in accordance with a preferred process of my present invention for the production of commercial ferromanganese products from low-grade manganese oxide-bearing ores of the general type described, I prefer to employ a covered electric furnace provided with one or more vertically extending electrodes mounted in conventional fashion. In operating such a furnace in both stages of my process, however, I avoid wetting of the electrodes with molten slag and thereby effectively avoid full slag resistance heating by maintaining their arcing tips a distance ranging from about one-half inch (½") above the surface of molten slag within the furnace to about three inches (3") below the surface of the molten slag. By operating the furnace in this manner, the heat generated in the slag by the $I^2R$ effects due to the resistance of the slag will reach a substantially constant temperature equivalent to the melting point of the slag and no higher while there is unmelted charge within the furnace. On the other hand, the heat generated in the short arcs (½" above to 3" within the slag) and due to the $I^2R$ effects of the arcs, per se, is of a higher order of temperatures, and, by controlling the applied voltage to the slag bath as well as the rate of feed of charge material (lbs. per KWH) to the furnace, I am able to control the combined slag resistance and arc resistance heat to a temperature within 100° C. of the melting point of the alloy produced.

Furthermore, I avoid penetration of the electrodes within a descending column of raw charge by introducing charge material into the interior of the arc resistance-slag resistance furnace and onto the surface of the molten slag bath maintained therein at a rate such that it is deposited on the surface of the molten slag bath between the furnace walls and the electrodes, or at a rate and direction of flow such that it does not flow into contact with the electrodes and does not build up on the surface of the slag surrounding the electrodes.

In carrying out a preferred process of my present invention, a further important feature thereof resides in the preliminary treatment of manganese oxide ore for purposes of providing a reduction charge to the first stage of substantially constant composition. Thus, I have found that it is essential for subsequent selective reduction in the smelting stages of the process that the manganese-bearing material be stabilized to a substantially constant composition by removal of all water, the labile oxygen from $MnO_2$, $CO_2$, $H_2O$, etc. For this purpose I heat the raw manganese-bearing ore in a rotary kiln or other suitable piece of equipment, prior to the initial reduction step, to a temperature within the range 900° C. to 1200° C. in order to stabilize it to a constant composition with respect to oxygen content and thereby obtain better control of reduction.

Figure 2:
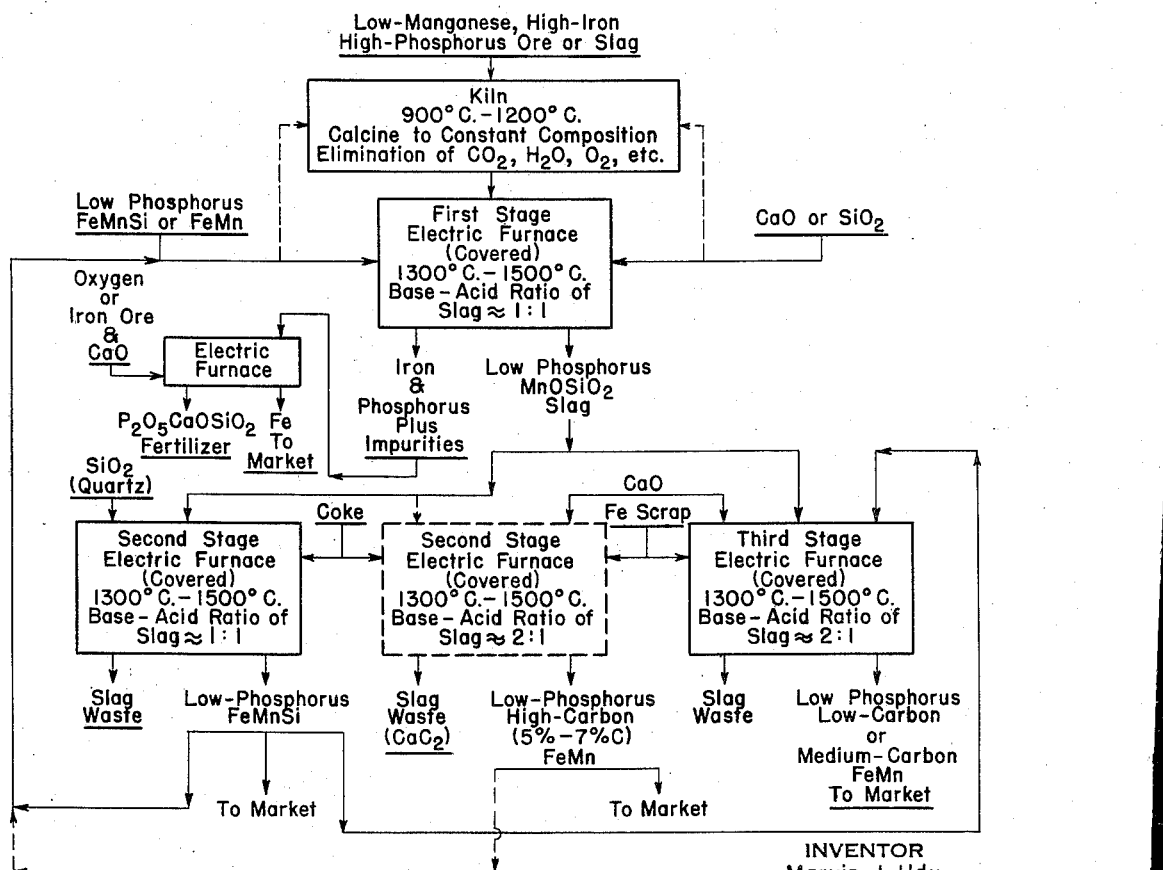

The aforementioned, as well as other features and objects of the invention, may be best understood by reference to the following description of specific embodiments thereof taken in conjunction with the accompanying drawings wherein:

Fig. 1 is a sectional elevation view of a covered electric furnace of the type employed in the smelting stages of the process of my present invention; and Fig. 2 is a schematic flow diagram or flow sheet illustrating the exact sequence of steps involved in a preferred process of my present invention, as well as various modifications of the preferred process.

In carrying out a process of the invention for smelting a charge comprising manganese oxide-bearing ore or concentrates or open hearth type slags, wherein the manganese content of the ore or slag is relatively low and is contaminated with relatively high phosphorus and high iron contents, the smelting charge employed in the first stage for the removal of iron, phosphorus and other impurities, may consist essentially of the calcined manganese oxide-bearing material, a relatively small amount of added fluxing material, if required, and a controlled amount of a low-phosphorus ferromanganese alloy or ferromanganese silicon alloy, as reducing agent. The components of the charge are so proportioned as to provide reducing agent in amount sufficient for (1) selective reduction to the metallic state of iron of iron oxide present in the charge in excess of that desired in the ferromanganese alloy sought to be produced, or, if the phosphorus content of the ore is very high in proportion to the iron content, and phosphorus removal is of paramount importance, the selective reduction of iron may be regulated to provide sufficient metallic iron to act as a collector for the amount of phosphorus to be removed from the ore, and iron oxide or metallic scrap iron can be added to the charge to the initial stage, as required, to insure the presence of sufficient metallic iron to function as a reservoir for all of the phosphorus to be eliminated, and (2) to reduce manganese of the higher oxides of manganese remaining after calcining to the manganous oxide (MnO) state without any appreciable reduction of manganese to the elemental or metallic state, and without vaporization of manganese; provision being made for retention of the major portion of the manganese in the oxide form in the molten manganese-silicate slag product produced in the first stage, and in an amount sufficient to form with the other basic components of the ore such as calcium oxide (CaO), magnesium oxide (MgO), barium oxide (BaO), etc., and with silica ($SiO_2$) present in the ore, slag having a molecular base to acid ratio of about 1.0 molecule of base to 1.0 molecule of acid (silica) or anywhere within the range 0.8 to 1.5 base to 1.0 acid, but preferably 1.2 base to 1.3 base to 1.0 acid. Thus, in calculating a charge for the initial smelting stage on the basis of a low-grade ore or concentrate which has been stabilized by calcining the raw ore or concentrate in the manner explained above, I calculate all basic constituents, including manganese oxide and other basic oxides such as calcium oxide, magnesium oxide, barium oxide, etc., to the equivalency of calcium oxide, and adjust the equivalent calcium oxide to silica to provide a slag of approximately 1 base to 1 acid, i. e., $MnO+MgO+BaO+CaO$, etc., to $SiO_2$ should be in the ratio of about 1:1; calcium oxide or an equivalent basic fluxing agent, or silica or an equivalent acid fluxing agent, being added only as required to adjust the base-acid ratio to the desired balance. Alumina ($Al_2O_3$) when present in the ore or concentrates in amounts less than ten percent (10%) to twelve percent (12%) may be disregarded in the calculations. Large amounts of alumina are calculated to silica equivalency.

By employing a low-phosphorus ferromanganese alloy as the reducing agent in the first stage for the selective reduction of iron and phosphorus from the high iron, high phosphorus ore or slag, the phosphorus content of the manganese-containing slag produced in this stage is decreased to an insignificant amount whereas the relatively low manganese content of the original ore or slag is benefited substantially by manganese values entering the slag from the ferromanganese reducing agent. The molten metallic iron functions as a collector for phosphorus reduced from the ore as well as other impurities such as arsenic, lead, copper, nickel, sulphur, cobalt, etc., and they are removed with and may be found in the metallic iron product recovered, which may be treated in a refining furnace for the recovery of metallic iron or discarded as dictated by the economics of a particular operation. In accordance with a preferred process of my invention, I treat the low-manganese, high-phosphorus metallic iron product recovered from the first stage reduction operation by smelting it in an electric furnace in the presence of additional quantities of iron ore, or in the presence of oxygen, and calcium oxide for the recovery of a marketable metallic iron product and a slag product containing phosphorus oxide (phosphoric anhydride—$P_2O_5$), calcium oxide, and silica, which may be marketed as a fertilizer material. It is of the utmost importance for efficient selective reduction in the initial smelting stage that the amount of reducing agent added to the furnace be calculated on the basis of a substantially constant composition charge, and, accordingly, that feature of my invention involving stabilization of the charge material by calcining prior to reduction, contributes substantially to the overall efficiency of my process.

In smelting a charge for the removal of iron and impurities in the first stage of a process of my invention, preferably, I employ a covered furnace provided with one or more vertically extending electrodes, and I operate the furnace at such voltages as to maintain the arcing tips of the one or more electrodes in position with respect to molten slag contained in the furnace within about one-half inch (½") above the surface of the molten slag bath to about three inches (3") below the surface of the slag bath, thereby avoiding wetting of the electrodes by deep immersion within slag. Furthermore, I introduce charge material into the furnace and onto the surface of the molten slag bath therein in such manner as to avoid any substantial build-up of charge material around the electrodes. Under such conditions of operation large amounts of power can be put into the slag under very accurate conditions of temperature control within the slag, and uniform reduction of iron is effected without the development of local intense temperature zones. Thus, I am able to maintain a very accurate temperature control within the furnace by suitably adjusting the rate of feed of charge material and the temperature of the slag bath obtained through conjoint use of arc resistance heating and slag resistance heating. The temperature of the slag within the furnace may be held to within 100° C. of the melting point of the alloy produced. With the slags utilized in accordance with the invention, I may operate at temperatures within the range of 1300° C. to 1500° C., thereby substantially avoiding vaporization of manganese as characteristically occurs in conventional submerged arc types of smelting operations by reason of the high temperatures required to produce fluid or workable slags and further resulting from accumulations of coke, etc. Furthermore, by regulating the electrodes in this manner, I am able to insure delivery to the molten slag bath of substantially all of the arc-developed heat and can inhibit any substantial dissipation of heat due to reflection. I also effectively avoid the establishment of high pressure zones around the electrodes caused by carbon monoxide gases generated during the reduction process becoming entrapped by deep beds of raw charge material, as occurs in conventional submerged arc operations, and the attendant danger to operators resulting from periodic so-called "blowing" of the charge under action of gases entrapped in this manner. The exact method of operating a furnace in accordance with my invention is explained more fully hereafter in connection with a description of Fig. 1 of the drawing.

Between the first and second smelting stages of the process of my invention, I prefer to employ a holding furnace in order to effect complete separation of iron and impurities from the molten manganese-enriched slag. The holding furnace may be of any suitable type and is operated such that power to compensate for radiation losses is all that is consumed in running the furnace. This procedure is particularly important when ore of high iron, high impurities, such as phosphorus, is being treated and iron and impurities must be removed.

In the second stage of a preferred process of the invention, the manganese-enriched slag produced in the initial smelting operation is charged either in molten form directly from the first furnace or from the holding furnace, or after cooling, to a second covered electric furnace operated in accordance with the same technique explained hereinbefore in connection with the initial smelting operation. The slag is introduced into the second furnace and onto the surface of a molten slag bath maintained therein, and the furnace is operated with the electrodes carried to a maximum depth of three inches within the layer of molten slag to procure accurate temperture control (1300–1500° C.), and to minimize losses through volatilization.

I may operate the furnace in the second stage of my process for (1) the direct production of a standard grade high-carbon ferromanganese product by controlled reduction, with a solid carbonaceous reducing agent, such as coal or coke, of iron oxide and manganese oxide of the slag, or, (2) I may treat the manganese-enriched slag from the first stage for the production of a ferromanganese silicon product for recovery as such, or, for use in conjunction with additional quantities of manganese silicate slag from the first stage in the production of standard grade low-carbon or medium-carbon ferromanganese products in a subsequent, or third stage smelting operation. Alternatively, low phosphorus, high-carbon ferromanganese or ferromanganese silicon produced in a second stage smelting operation of the invention, may be recycled for use as a reducing agent in the initial smelting operation for the removal of iron and phosphorus and enrichment of the original low-manganese ore or slag.

In operating the second furnace for the production of low-phosphorus ferromanganese silicon in accordance with a process of my invention, carbonaceous reducing material in the form of coal or coke, and silica to provide sufficient silicon for the alloy to be produced and preferably in the form of high-grade quartz, are added to the manganese-silicate slag in forming a charge for the furnace. If silica is present in the slag from the first stage over and above the desired 1:1 ratio of base and acid, less silica or quartz need be added to the second furnace since a portion of the silicon required can be reduced from the slag. Carbonaceous reducing material is employed in an amount sufficient to, (1) provide for the reduction to the metallic state of iron of iron oxide and manganese contained in manganese oxide, (2) provide for the reduction of silica in an amount equivalent to that desired in the final ferromanganese silicon product, and (3) provide carbon for chemical combination with the ferromanganese silicon produced, to the extent desired in the final product. The resulting slag is adjusted to provide a base-acid ratio of 1.0 to 1.5 base to 1.0 acid. A higher ratio of base may be employed but this practice results in higher operating temperatures and increased power consumption. By suitably adjusting the charge components in the second stage I may recover ferromanganese silicon products for use in the production of either medium-carbon ferromanganese or low-carbon ferromanganese in a third stage in the presence of additional quantities of manganese-enriched slag from the first stage.

In utilizing a ferromanganese silicon alloy produced in the second stage as a non-carbonaceous reducing agent for the production of medium-carbon ferromanganese or low-carbon ferromanganese, I employ a third furnace operated in exactly the same manner as the furnace in the first and second stage smelting operations, and supply to the surface of a molten slag bath maintained therein, a charge consisting of manganese silicate slag from the first stage or from the holding furnace, ferromanganese silicon from a second stage smelting operation, added basic fluxing material such as calcium oxide, and scrap iron or equivalent iron oxide, as required, to provide for the production of a standard grade ferromanganese product. The components of the charge are so proportioned as to provide reducing agent in an amount sufficient to reduce to the metallic state iron of iron oxide present in the slag from the first stage or added to the charge, and to reduce to elemental manganese manganese oxide displaced from chemical combination with silica by a stronger base (lime) in the manganese-silicate slag. Thus, in calculating a charge for the third furnace, I calculate all basic constituents other than manganese oxide, such as calcium oxide, magnesium oxide, etc., to the equivalency of calcium oxide, and adjust the equivalent calcium oxide to the silica in the charge to provide for the production of a slag of approximately 2 base to 1 acid (or anywhere within the range 1.7 to 2.2 molecules of base to 1.0 molecule of acid) i. e., $MgO+BaO+CaO$, etc. to $SiO_2$ should be in the ratio of about 2:1; calcium oxide or an equivalent basic fluxing agent being added only as required to adjust the base-acid ratio to the desired range. When employing a non-carbonaceous reducing agent in this manner, it is desirable to provide slag forming material in an amount equivalent to that required for combining with any acid component formed as the result of the reduction of manganese and iron in the molten slag.

Of course, one could produce medium-carbon ferromanganese or low-carbon ferromanganese directly in the second stage from manganese-silicate slags obtained in the first stage by employing non-carbonaceous reducing material from an external source. For example, the reduction in the second stage smelting operation may be conducted with silicon metal or aluminum for the production of low-carbon ferromanganese. For reasons of economy, however, and inasmuch as the process of my invention is designed for use in connection with low-grade ores or slags not heretofore usable in any known process, I prefer to operate substantially exclusively, wherever possible, with raw materials obtained from the process of the invention. It is the provision of a unitary or completely self-contained process for the utilization of these heretofore unusable ores and slags in the production of valuable commercial products which renders the process of the invention economically feasible.

When manganese-silicate slags produced in the first stage are treated in the second stage for the direct production of a high-carbon (5–7%) ferromanganese (80% Mn) product, I operate the furnace in the second stage in exactly the same manner as in the other stages of the process described hereinbefore. The molten slag from the first stage or from the holding furnace is charged to the second-stage furnace and onto the surface of a molten slag bath maintained therein. In calculating a charge for the second stage production of high-carbon ferromanganese, I calculate all basic constituents other than manganese oxide, such as calcium oxide, magnesium oxide, barium oxide, etc., to the equivalency of calcium oxide and adjust the equivalent calcium oxide to the silica in the charge to provide for the production of a slag of approximately 2 base to 1 acid; adding calcium oxide or an equivalent basic fluxing agent to adjust the base-acid ratio to the desired range. It is essential that the coal, coke, etc., used as a reducing agent be dry, and, that carbon be provided in an amount sufficient for reduction of manganese of manganese oxide displaced from silica in the manganese-silicate slag by a stronger base (lime), reduction of iron of iron oxide present in the slag from the first stage or added to the charge for purposes of adjusting the iron content to standard grade ferromanganese, chemical combination with metallic iron and manganese for the production of high-carbon ferromanganese, and to form in the basic slag (2 CaO to 1 $SiO_2$) a small amount of calcium carbide ($CaC_2$). It is the formation and presence in the slag of but a trace of calcium carbide which permits the production of slags very low in manganese, in that, a slight amount of calcium carbide in the slag upsets the equilibrium of the manganese oxide and slag and permits almost complete reduction of manganese. In this manner, slags containing one percent (1.0%) or less of manganese can be produced readily as compared with ten percent (10%) to twenty percent (20%) present in slags formed in accordance with conventional smelting techniques. Alternatively, instead of forming the calcium carbide in the slag from the lime and coke additions, I may add calcium carbide to the charge directly in varying quantities either in the form of a high-grade product (4.75 cu. ft. $C_2H_2$ per pound) or a low-grade product (2.5 to 3.5 cu. ft. $C_2H_2$ per pound). The calcium carbide may be used in whole or in part with coke or in place of coke as the reducing agent. It functions to supply lime for the silica and acts as a reducing agent for manganese and iron when used in larger amounts than the trace necessary to produce a very low manganese slag. I may also employ a reducing agent such as ferrosilicon, silicon carbide or aluminum to reduce last traces of manganese from manganese slags to produce waste slags very low in manganese in lieu of calcium carbide in the manner explained above, provided lime is added, as required, to maintain the desired ratio of 2.0 base to 1.0 acid within the slag. The charge is smelted in the second furnace at a temperature controlled within the range 1300° C.–1500° C. in the manner previously explained in connection with the initial and subsequent smelting stages, with the production of a high-carbon ferromanganese product and a waste slag product.

In order to initiate operation of a furnace within any stage of my process, I may deliberately add extra slag of approximately a 1:1 or 2:1 ratio of CaO to $SiO_2$ depending on the desired slag composition for the particular stage, to establish a shallow layer of molten slag within the furnace. After slag has accumulated in a furnace, it is removed as required, but I always leave sufficient slag in the furnace so that the electrode tips can be carried on the slag or to the depth desired, as specified hereinbefore. I have found that operation with the electrodes carried to a depth of one-half inch (½") above to a maximum of three inches (3") within the shallow layer of molten slag produces optimum results under actual operating conditions. Operation of the furnaces in this manner permits the conjoint use of arc resistance and slag resistance heating within the smelting furnaces. Through operation of the furnace constantly as an arc resistance-slag resistance furnace with short arcs, and, by reason of the substantially constant resistance slag bath obtained through control of the depth of slag within a furnace, I am able to operate constantly at a power factor of 95% as compared with power factors of 75% to 85% at which large arc electric furnaces are operated in accordance with heretofore customary practices.

In the operation of the electric furnace according to my invention, automatic electrode regulators are set to maintain the electrodes in constant or substantially fixed positions relative to the surface of the molten slag bath, because, for a particular type of operation, the slag is of substantially constant composition, and, therefore, of substantially constant resistance. When an increase or decrease in the temperature of the molten slag is desired for a particular operation, the voltage and power input is simply increased or decreased and the electrode regulator is adjusted to maintain the arc lengths within the desired range specified hereinbefore. In following this procedure, the resistance is maintained constant and, consequently, the power input is increased or decreased.

It should be apparent that by increasing or decreasing the arc gaps within the limits specified hereinbefore, I am able to control both arc resistance heat supplied to the charge and slag resistance heat developed within the charge, and the conjoint use of heat supplied from both sources enables me to effect a very accurate temperature control of the overall slag bath. Furthermore, the temperature control effected in this manner is not subject to frequent unbalance because of local intense temperature zones caused by coke accumulations, etc., since I avoid the build-up of charge material around the electrodes and thereby effectively avoid conditions which lead to the establishment of such zones of uncontrollable heat.

The exact method of operating a furnace within the various stages of my process may be best understood by reference to Fig. 1 of the drawing wherein I have shown such a furnace 10, which may be of any suitable configuration in horizontal cross-section. The furnace 10 comprises a hearth or bottom portion 11, side walls 12, and a roof 13 all formed of appropriate refractory materials.

The furnace roof 13 is provided with suitable openings through which electrodes 14 (one shown) extend and which permit vertical movement of the electrodes in accordance with operational demands and characteristics. The space between the electrodes and the edge of the openings through which they extend or project may be povided with any suitable packing or sealing means to inhibit or restrict the flow of gases between the interior of the furnace without interfering with the necessary vertical movement of the electrodes.

Hoppers 15 having their lower portions extending through and sealed in openings in the roof 13 are provided adjacent the outer side edges of the arc electric furnace 10 in alinement with the electrodes to permit introduction of charge material 16 into the interior of the furnace. Those portions of the side walls of the furnace immediately beneath hoppers 15, as indicated by reference numeral 17 in Fig. 1, preferably are so designed as to provide a slope corresponding to or equivalent to the angle of repose of the charge material. Preferably, the sloped portions of the walls are stepped, as shown in Fig. 1, to provide for the deposition and retention thereon of protective coatings of charge material.

When a carbonaceous reducing agent is included within the charge to a furnace in any stage, a conduit (not shown) is provided for communicating with the interior of the furnace 10 through an opening in the roof to permit the collection and utilization of carbon monoxide produced during the course of the reduction. A charging spout or runner or launder 18 is provided to permit the introduction into the interior of furnace 10 of slag from a preceding stage. The slag introduced may be in the molten stage or in the solidified and granular or finely-divided state. If desired, solid granular or finely-divided slag to be treated may be introduced into the interior of the furnace 10 as a component of the charge introduced through the hoppers 15. The calcined ore or concentrates charged to the initial stage may be introduced into the interior of the furnace 10 as a component of the charge material supplied through hoppers 15 or through launder 18 as a hot product directly from the kiln. The furnace 10 is further provided with a conventional taphole 19 through which molten low-phosphorus ferromanganese silicon or ferromanganese products and molten slag may be delivered from the interior of the furnace to a suitable ladle 20 at appropriate times.

It is to be understood, of course, that other conventional types of furnaces may be substituted for the furnace 10 in any stage of my process, but not without a substantial sacrifice in the overall efficiency of the process as described hereinbefore.

The following is an analysis of a typical ore that may be used in the production of valuable ferromanganese products in accordance with a process of my invention:

LOW MANGANESE—HIGH PHOSPHORUS—HIGH IRON ORE

| | Percent |
|---|---|
| Manganese (Mn) | 11.0 |
| Calculated to MnO | 13.15 |
| Iron (Fe) | 26.6 |
| Calcium oxide (CaO) | 6.68 |
| Magnesium oxide (MgO) | 2.11 |
| Alumina ($Al_2O_3$) | 8.20 |
| Silica ($SiO_2$) | 18.5 |
| Phosphorus (P) | 1.00 |
| Sulphur (S) | 0.068 |
| Loss on ignition | 8.0 |

The following example illustrates the specific application of the foregoing principles and objects of the invention to the production of ferromanganese products:

*Example.*—*Preparation of ferromanganese silicon and high, medium and low-carbon ferromanganese products from ore of the analysis above*

The raw ore was first heated in a rotary kiln at a temperature of 1050° C. to drive off water and carbon dioxide and to stabilize the ore for selective reduction of iron and phosphorus. The analysis of the ore after calcining was as follows:

| | Percent |
|---|---|
| Manganese (Mn) | 12.0 |
| Calculated to MnO | 15.4 |
| Iron (Fe) | 29.0 |
| Calcium oxide (CaO) | 7.27 |
| Magnesium oxide (MgO) | 2.30 |
| Alumina ($Al_2O_3$) | 9.50 |
| Silica ($SiO_2$) | 20.70 |
| Phosphorus (P) | 0.98 |
| Sulphur (S) | 0.07 |

*First stage (removal of iron, phosphorus and impurities).*—The base-acid ratio of the calcined ore is approximately equivalent to the desired balance of 1.2 base to 1.0 acid, but where required, adjustment must be made for acid (silica) entering the slag from silicon of the ferromanganese silicon reducing agent.

A charge consisting of 100 pounds of ferromanganese silicon of the foregoing analysis, 364.8 pounds of calcined ore (105.8 lbs. iron), and 5 pounds of silica was smelted at a temperature of 1425° C. in a covered furnace of the type illustrated in Fig. 1 and operated in accordance with the principles of the invention, to produce iron and a slag product containing the manganese and silicon of the FeMnSi in oxide form and having the following composition:

| | Percent |
|---|---|
| MnO | 49.5 |
| (Mn) | 39.40 |
| FeO | 7.90 |
| (Fe) | 6.15 |
| CaO | 3.62 |
| MgO | 1.17 |
| $Al_2O_3$ | 4.84 |
| $SiO_2$ | 32.8 |
| P | 0.051 |
| S | 0.0185 |

With reference to the foregoing analytical data, it may be seen that the manganese content of the original ore was increased from twelve percent (12%) to over thirty-nine percent (39%) in the slag recovered from the first stage, whereas the phosphorus content was reduced to an insignificant amount within the manganese-enriched slag product. The principal base present in the slag is manganese oxide.

*Second stage (production of high-carbon ferromanganese).*—The hot manganese-enriched slag from the first furnace or from an intermediate holding furnace, if one is employed, is transferred to another furnace of the arc resistance-slag resistance type and smelted with controlled amounts of lime and carbon to produce a standard grade high-carbon ferromanganese product. Lime is added to the second furnace to give a base-acid ratio in the final slag, excluding manganese oxide, of 2.0 base to 1.0 acid.

For each 100 pounds of molten slag charged to the second stage, I add approximately 60 pounds of lime, and carbon as coke, anthracite, coal, charcoal, etc., in an amount sufficient to effect reduction of all the manganese oxide and iron oxide in the slag to manganese and iron, and to produce a small amount or trace of calcium carbide in the slag, or, I may add calcium carbide directly to the slag in any desired amount. Iron scrap or iron ore is added to the charge to adjust to 80% manganese in the ferromanganese alloy. The product recovered from the second stage is high-carbon (5–7% C) standard grade (78 to 80% Mn) ferromanganese containing less than one percent (1.0%) silicon and low in phosphorus, which may be marketed as such or recycled for use as a reducing agent in the first stage smelting operation. The slag is a dicalcium silicate slag of about the same weight as the slag originally charged to the furnace. Manganese oxide and iron oxide have been removed but replaced with about an equal amount of lime. The slag contains manganese in the order of one to two percent (1–2%).

In order to produce medium-carbon ferromanganese or low-carbon ferromanganese in the second stage, I may employ a FeMnSi reducing agent of twenty percent (20%) silicon or forty percent (40%) silicon from an external source, depending on the carbon content desired in the final metal, and adjust the charge components to provide for the production of a waste slag product having a base-acid ratio of 2 to 1 exclusive of MnO and FeO present in the slag from the first stage, but including silica resulting from silicon of the FeMnSi reducing agent. The slag from the first stage is transferred while hot from the first furnace or holding furnace to another furnace of the arc resistance-slag resistance type and lime and FeMnSi are added in controlled amounts. The reaction is exothermic at the temperature of the slag and power is used for refining only. In this manner, standard medium-carbon or low-carbon ferromanganese can be produced very economically from otherwise unusable high-phosphorus, high-iron, low-manganese ores or slags.

When medium-carbon or low-carbon ferromanganese is desired as a final product of the process of the invention, I prefer to operate the second stage for the production of FeMnSi from the manganese-enriched slag recovered from the first stage and to employ the FeMnSi thus produced in lieu of FeMnSi from an external source, as the reducing agent in a third stage smelting operation with additional quantities of manganese-enriched slag from the first stage. Alternatively, I may employ a ferromanganese silicon alloy produced in the second stage as the reducing agent in the first stage smelting operation, or, I may market the alloy as such.

More detailed information with respect to the production of ferromanganese silicon and medium and low-carbon ferromanganese products in the second and third stages of the process of the invention may be obtained by reference to my copending application Serial No. 523,697, filed of even date herewith and entitled "Process for the Production of Ferromanganese From Low-Grade Manganese-Bearing Materials."

In Fig. 2 of the drawings, I have illustrated in schematic form the process of my invention, wherein the solid lines designate the sequence of operations for the production of ferromanganese silicon and medium-carbon or low-carbon ferromanganese and the dash lines designate a preferred process of the invention for the production of high-carbon ferromanganese in a second stage reduction operation, as well as alternate routes of flow for various charge components and materials employed or produced in the various stages of my invention.

Since it is considered obvious that many changes and modifications can be made in the foregoing methods and procedures without departing from the nature and spirit of my invention, it is to be understood that the invention is not to be limited to the specific details offered by way of illustration above, except as set forth in the following claims.

I claim:

1. In a process for obtaining relatively low-phosphorus, enriched manganese values from low-manganese, high-phosphorus, high-iron bearing material, the improvement which comprises passing the material in the form of a charge into a covered electric furnace and onto the surface of a molten slag bath maintained therein, subjecting the charge to the action of a relatively low-phosphorus ferromanganese-alloy reducing agent within the furnace at a temperature within the range 1300° C.–1500° C. to effect reduction to the metallic state of the major portion of the iron of the charge material with the production of molten metallic iron containing phosphorus present in the original charge material, and a low-phosphorus, manganese-enriched molten slag product containing substantially all of the manganese of the original charge material together with manganese of the ferromanganese-alloy reducing agent.

2. The process as claimed in claim 1 wherein iron is added to the charge to the smelting furnace to provide for the production of sufficient metallic iron to function as a collector for all of the phosphorus to be removed from the charge material.

3. The process as claimed in claim 1 wherein the molten metallic iron and molten slag are charged to a holding furnace to effect more complete separation and settling of metallic iron and phosphorus from the manganese-enriched molten slag produced in the electric furnace.

4. The process as claimed in claim 1 wherein the temperature within the furnace is controlled within the range 1300° C.–1500° C. during the course of the process by (1) maintaining the arcing tips of the furnace electrodes between about one-half inch (½") from the upper surface of the molten slag bath therein, and about three inches (3") below the upper surfaces of said molten slag bath, (2) maintaining a substantially constant resistance slag bath within the furnace by controlling the depth of molten slag, and (3) introducing charge material into the furnace and onto the surface of the molten slag bath therein at a rate and in a direction of flow such as to avoid substantial submergence of the arcing tips of the electrodes within raw charge material.

5. The process as claimed in claim 1 wherein the low-phosphorus, manganese-enriched molten slag product is separated from the molten metallic iron and passed into a second covered electric furnace and onto the surface of a molten slag bath maintained therein, subjecting the slag to the action of a reducing agent within the second furnace at a temperature within the range 1300° C.–1500° C. to effect reduction to the metallic state of the manganese oxide and the remainder of the iron oxide contained therein with the production of a molten ferromanganese alloy and molten residual slag, and separating and recovering the molten ferromanganese alloy from the molten residual slag.

6. The process as claimed in claim 5 wherein manganous oxide of the manganese-bearing material is used in the first furnace as a basic fluxing agent to produce a relatively low-temperature slag.

7. The process as claimed in claim 5 wherein fluxing material is added to the charge to the first furnace in an amount sufficient to produce a low-phosphorus, manganese-enriched slag product comprising silica and basic oxides including manganese oxide in proportions equal to about 1.0 molecule of basic oxide to 1.0 molecule of silica, fluxing material is added to the charge to the second furnace in an amount sufficient to produce a molten residual slag product comprising silica and basic oxides excluding manganese oxide in proportions equal to about 1.0 to 1.5 molecules of basic oxide to 1.0 molecule of silica, operation of the second furnace being conducted for the production and recovery of a molten low-phosphorus ferromanganese silicon alloy.

8. The process as claimed in claim 7 wherein the molten low-phosphorus ferromanganese silicon alloy recovered from the second furnace is recycled to the first furnace for use as a reducing agent in the treatment of additional quantities of high-iron, high-phosphorus, low-manganese bearing material.

9. The process as claimed in claim 5 wherein fluxing material is added to the charge to the first furnace in an amount sufficient to produce a low-phosphorus, manganese-enriched slag product comprising silica and basic oxides including manganese oxide in proportions equal to about 1.0 molecule of basic oxide to 1.0 molecule of silica, fluxing material is added to the charge to the second furnace in an amount sufficient to produce a molten residual slag product comprising silica and basic oxides excluding manganese oxide in proportions equal to about 1.0 to 1.5 molecules of basic oxide to 1.0 molecule of silica, operation of the second furnace being conducted for the production and recovery of a molten low-phosphorus ferromanganese silicon alloy, and said low-phosphorus molten ferromanganese silicon alloy is charged in a controlled amount to a third covered electric furnace and onto the surface of a molten slag bath maintained therein together with additional quantities of the molten manganese-enriched slag recovered from the first furnace and smelted at a controlled temperature within the range 1300° C.–1500° C. with the production and recovery of a medium-carbon ferromanganese product, the temperature within all three furnaces being controlled within the range 1300° C.–1500° C. during the course of the process by maintaining the arcing tips of the furnace electrodes between about one-half inch (½") from the upper surfaces of the molten slag baths therein and about three inches (3") below the upper surfaces of said molten slag baths, thereby to effect combined arc-resistance and slag-resistance heating.

10. The process as claimed in claim 5 wherein fluxing material is added to the charge to the first furnace in an amount sufficient to produce a low-phosphorus, manganese-enriched slag product comprising silica and basic oxides including manganese oxide in proportions equal to about 1.0 molecule of basic oxide to 1.0 molecule of silica, fluxing material is added to the charge to the second furnace in an amount sufficient to produce a molten residual slag product comprising silica and basic oxides excluding manganese oxide in proportions equal to about 1.0 to 1.5 molecules of basic oxide to 1.0 molecule of silica, operation of the second furnace being conducted for the production and recovery of a molten low-phosphorus ferromanganese silicon alloy, and said low-phosphorus molten ferromanganese silicon alloy is charged in a controlled amount to a third covered electric furnace and onto the surface of a molten slag bath maintained therein together with additional quantities of the molten manganese-enriched slag recovered from the first furnace and smelted at a controlled temperature within the range 1300°–1500° C. with the production and recovery of a low-carbon ferromanganese product, the temperature within all three furnaces being controlled within the range 1300° C.–1500° C. during the course of the process by maintaining the arcing tips of the furnace electrodes between about one-half inch (½") from the upper surfaces of the molten slag baths therein and about three inches (3") below the upper surfaces of said molten slag baths, thereby to effect combined arc-resistance and slag-resistance heating.

11. The process as claimed in claim 5 wherein fluxing material is added to the charge to the first furnace in an amount sufficient to produce a low-phosphorus, manganese-enriched slag product comprising silica and basic oxides including manganese oxide in proportions equal to about 1.0 molecule of basic oxide to 1.0 molecule of silica, and fluxing material is added to the charge to the second furnace in an amount sufficient to produce a molten residual slag product comprising silica and basic oxides excluding manganese oxide in proportions equal to about 1.7 to 2.2 molecules of basic oxide to 1.0 molecule of silica, operation of the second furnace being conducted for the production and recovery of a molten low-phosphorus, high-carbon ferromanganese product.

References Cited in the file of this patent
UNITED STATES PATENTS

| | | |
|---|---|---|
| 1,352,580 | Cinille | Sept. 14, 1920 |
| 1,484,670 | Petinot | Feb. 26, 1924 |
| 1,835,925 | Becket | Dec. 8, 1931 |
| 1,857,779 | Flodin et al. | May 10, 1932 |
| 2,020,101 | Brown | Nov. 5, 1935 |
| 2,098,176 | Udy | Nov. 2, 1937 |
| 2,523,092 | Bryk et al. | Sept. 19, 1950 |
| 2,549,994 | Udy | Apr. 24, 1951 |
| 2,598,744 | Handwerk et al. | June 3, 1952 |
| 2,598,745 | Handwerk et al. | June 3, 1952 |

FOREIGN PATENTS

| | | |
|---|---|---|
| 18,945 | Great Britain | 1910 |
| 8,400 | Great Britain | 1912 |